INVENTOR.
ARTHUR WALSH
BY
*Donald C. Kolasch*
ATTORNEY

United States Patent Office 3,551,313
Patented Dec. 29, 1970

3,551,313
IMAGE CONTRAST CONTROL IN PHOTO-
ELECTROPHORETIC IMAGING
Arthur Walsh, Rochester, N.Y., assignor to Xerox Corporation, Rochester, N.Y., a corporation of New York
Filed Sept. 3, 1968, Ser. No. 756,800
Int. Cl. G03g 13/22
U.S. Cl. 204—181                     11 Claims

ABSTRACT OF THE DISCLOSURE

A method of controlling the contrast of polychromatic and monochromatic photoelectrophoretic images by selectively varying the potential applied to the imaging rollers of the system.

BACKROUND OF THE INVENTION

Figure 1:
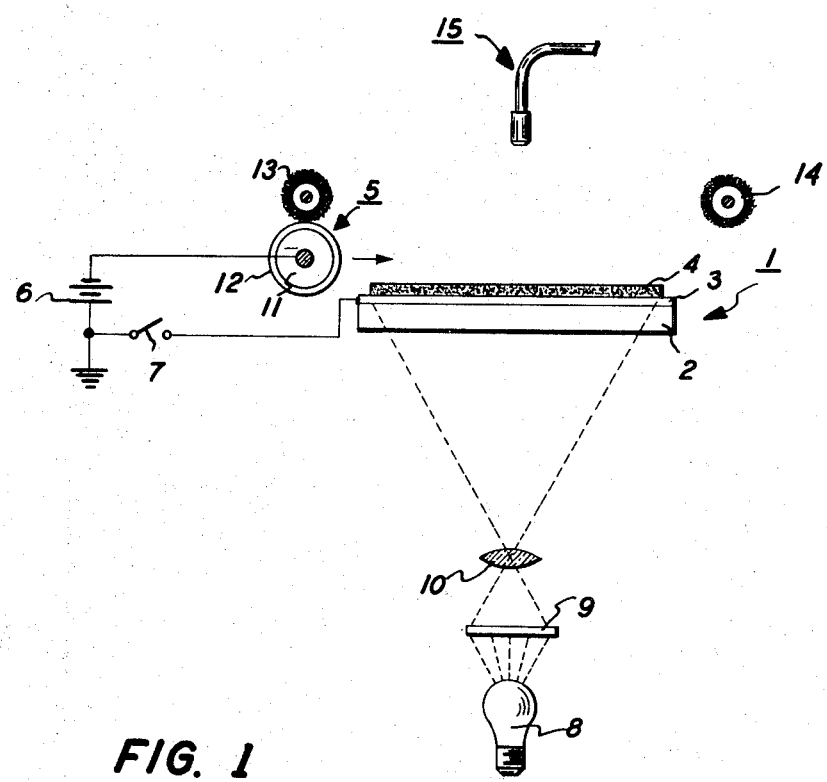

This invention relates to an imaging system and more specifically to electrophoretic imaging system.

In photoelectrophoretic imaging colored photosensitive particles are suspended in an insulating carrier liquid. This suspension is placed between a pair of electrodes, subjected to a potential difference and exposed to an image to be reproduced. Ordinarily, in carrying out the process, the imaging suspension is placed on a transparent electrically conductive plate in the form of a thin film and exposure is made through the transparent plate while a second generally cylindrically shaped electrode is rolled across the top of the suspension. The particles are believed to bear an initial charge when they are suspended in the liquid carrier which causes them to be attracted to the transparent base electrode and upon exposure, to change polarities by exchanging charge with the base electrode such that the exposed particles migrate away from the base electrode to the second or roller electrode thereby forming images on both of the electrodes by particle subtraction each image being complementary to the other. The process may be used to produce both polychromatic and monochromatic images. In the latter instance a single color photoresponsive particle may be used in the suspension or a number of differently colored photoresponsive particles may be used in the suspension all of which respond to the same wavelength of light exposure. An extensive and detailed description of the photoelectrophoretic imaging technique as described above may be found in U.S. Pat. Nos. 3,383,-993, 3,384,488, 3,384,565 and 3,384,566.

In the case of the polychromatic imaging process the imaging suspension will contain a plurality of at least two differently colored finely divided particles in a carrier liquid, each of said particles comprising an electrically photosensitive pigment whose principal light absorption band substantially coincides with its principal photosensitive response. Thus, the pigment represents both the primary electrically photosensitive ingredient and the primary colorant for the specific particle in suspension. The particles in the polychromatic system preferably have intense pure colors and are generally highly photosensitive. It is preferred that the particles migrate with minimum exposure to activating electromagnetic radiation and that particles of each color migrate to an equal extent upon equal exposure to light of the complementary color. Where the particle mix is exposed to a multicolored image particles will migrate to one electrode in proportion to the intensity of the light which they absorb. This migration should take place with a minimum of electrical interaction between particles of different colors. Thus it is preferred and desired that particles selectively remain on one of the electrodes in image configuration with unwanted particles migrating to the other electrode in the system. For example, when a mixture comprising cyan, magenta and yellow particles is exposed to an image by yellow light, the cyan and magenta particles should migrate thus leaving behind an image made up of yellow particles. Similarly, when exposed to a multicolored image, different colored particles absorb light of their complementary color in appropriate image areas and migrate leaving a full colored image corresponding to the original.

Although it has generally been found that good quality images can be produced, especially when a relatively insulating "blocking electrode" surface is used in the system, due to the nature of the imaging suspension and process requirements degrees of difficulty have been encountered in producing high contrast images representing proper color separtaion. Obtaining maximum image density and satisfactory particle separation has been found to be difficult. Particles of some colors migrate more rapidly than particles of other colors and build up on the surface of the electrode towards which they migrate thereby impeding the deposition of the slower unwanted particles. This degrades the desired image remaining in that some of the unwanted particles remain also. For example, it has been found that yellow particles often migrate at a slower rate than cyan particles. Thus, in areas where both cyan and yellow particles should migrate leaving behind a magenta image the cyan particles migrate more rapidly and build up a layer on the surface of the electrode towards which they migrate thus preventing proper migration and adherence of the yellow particles. The image remaining thus has an undesirable yellow or orange cast in the red areas. Thus there is a continuing problem in electrophoretic imaging systems of removing unwanted particles and leaving only those necessary to form the desired image.

It has been proposed in order to enhance the above mentioned color separation that the cylindrically shaped second electrode employed in the system be passed across the surface of the imaging suspension at least one additional time under conditions similar to those of the initial pass thereby removing a greater proportion of the unwanted pigment particles and producing the desired image. Although this approach has been found useful in enhancing the ultimate color properties of the resulting image, optimum image quality as it relates to image contrast and color representation has yet to be achieved.

SUMMARY OF THE INVENTION

It is therefore an object of this invention to provide an imaging system which will overcome the above noted disadvantages.

It is a further object of this invention to provide a high quality electrophoretic imaging system.

Yet, still a further object of this invention is to provide a contrast control electrophoretic imaging system.

Another object of this invention is to provide a electrophoretic imaging system whereby pigment transportation may be selectively controlled.

It is still a further object of this invention to provide an improved method for removing unwanted particles from a multicolor particle mix in a manner so as to control the contrast of the resulting print.

It is still another object of this invention to provide a continuous method of forming electrophoretic images of high color purity.

Yet, still another object of this invention is to provide an electrophoretic imaging process capable of producing a higher quality color image than heretofore thought possible.

The foregoing objects and others are accomplished in accordance with the present invention generally speaking by providing in conjunction with an electrode system a suspension of variously colored light absorbing photoelectrophoretic imaging particles in an insulating carrier liquid, at least one of the electrodes in the system being partially transparent. The imaging suspension is exposed selectively to an electromagnetic radiation source through the transparent electrode while simultaneously applying voltage across the imaging suspension. As a result of particle migration within the system an image is formed on the surface of the transparent electrode with the colored particles complementary to that of the image formed on the transparent electrode migrating to the surface of the remaining imaging electrode. The imaging electrode supporting the complementary, unwanted image particles is then removed and a second imaging or image enhancement electrode is introduced and the exposure process repeated in the above described manner. The imaging voltage for this second exposure step is reduced or increased substantially below or above that of the initial pass voltage thereby selectively removing pigment particles from the image originally formed on the transparent electrode and thus providing a means for controlling the quality and contrast of the final image. The step of re-exposing the imaged transparent electrode to an "enhancement electrode" at a varied voltage may be repeated a number of times depending, for example in the case of a polychrome process, upon the degree of color purity desired.

Control of contrast in the electrophoretic imaging process described above generally has been lacking in that previously the only control was to prepare the imaging suspension at a given pigment-to-solvent concentration after which the contrast could no longer be effectively changed. During the normal imaging steps, at the conventional imaging voltages, the second and subsequent roller electrodes remove pigment particles both from the image as well as the background areas of the transparent electrode. Thus, although reducing background the second and subsequent imaging steps have also decreased the image density as well as the contrast in an uncontrollable manner. It has been determined in the course of the present invention that by altering the voltage on the second imaging or image enhancement roller electrode, removal of pigment from the image formed on the transparent electrode may be selectively controlled as a function of exposure thereby providing a technique for controlling image contrast. Thus by raising or lowering the voltages between the first imaging roller and the subsequent imaging rollers the density and contrast of the resulting image may be controlled.

The electrophoretic imaging system of the present invention employs intensely colored pigment particles which serve both as the colorant and as the photosensitive material which apparently undergo a net change in charge polarity upon exposure to activating radiation by interaction with one of the electrodes. No additional photosensitive elements or materials are necessary thus providing a very simple and inexpensive imaging technique. As a result of the mixture of two or more differently colored particles each of which is sensitive only to light of a specific wavelength the images are produced in color. It has been found that the particles respond in the regions of the spectrum of their principle light absorption with the cyan, magenta and yellow particles responding to red, green and blue light, respectively. Thus the system is most suited to subtractive color synthesis.

DESCRIPTION OF DRAWINGS AND DETAILED DESCRIPTION OF INVENTION

Figure 2:
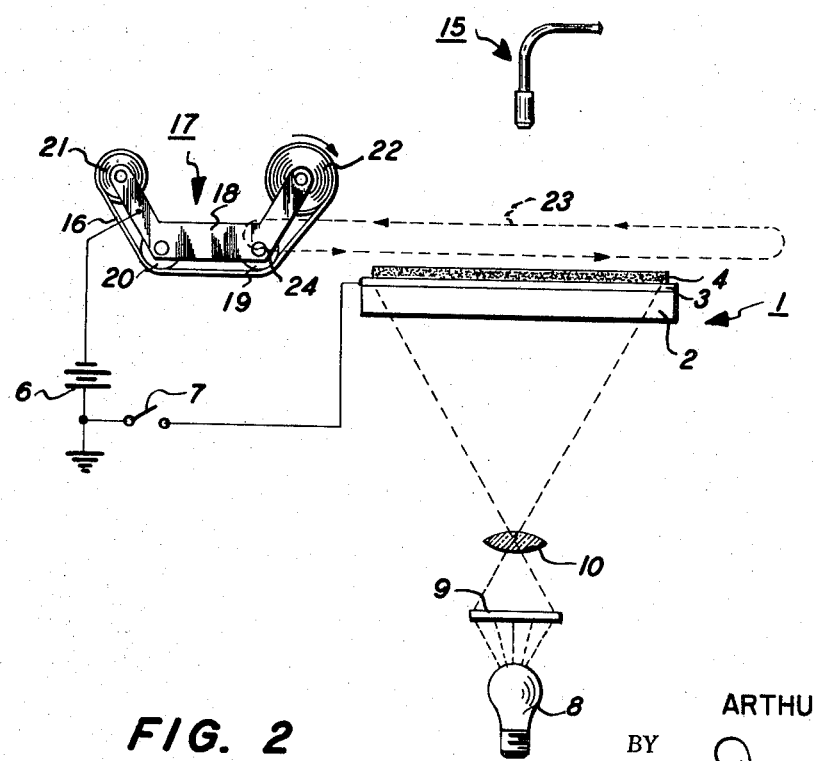

The invention is further illustrated in the accompanying drawings wherein:

FIG. 1 shows a side view of a simple exemplary system for carrying out the steps of the present invention wherein the imaging electrode is cleaned between exposure steps and the voltage applied during the ensuing passes is reduced; and FIG. 2 shows a second embodiment similar to that of FIG. 1 wherein the imaging electrode is replaced between exposure steps.

Referring now to FIG. 1 there is seen a transparent electrode generally designated 1 which, in this exemplary instance, is made up of a layer of optically transparent glass 2 overcoated with a thin transparent layer 3 of tin oxide and commercially available under the tradename NESA glass. This electrode will hereinafter be referred to as the injecting electrode. Coated on the surface of the injecting electrode is a thin layer 4 of the imaging suspension of the present invention which consists of finely divided photosensitive particles dispersed in an insulating carrier liquid. During this initial part of the description of the invention, the term "photosensitive" may be thought of as any particle which, once attracted to the injecting electrode will migrate away from it under the influence of an applied electric field when it is exposed to actinic electromagnetic radiation. The imaging suspension 4 may also contain a sensitizer and/or binder for the pigment particles which is at least partially soluble in the suspending or carrier liquid. Above the liquid imaging suspension is passed electrode 5 which in this illustration is represented as a roller having a conductive central core 11 connected to a power source 6. The core in this instance is covered with a layer of blocking electrode material 12 which may, for example, be Tedlar. The opposite side of potential source 6 is connected to the injecting electrode 1 so that when switch 7 is closed an electric field is applied across the imaging suspension 4 between electrodes 5 and 1. The electrodes 5 is referred to above and in the ensuing discussion as the imaging, or image enhancement electrode the term being used interchangeably. This electrode is also referred to as the blocking electrode due to the nature of the structure of the electrode. The pigment suspension is exposed by way of the projection mechanism made up of light source 8, a transparency 9 and a lens system 10. For purposes of this illustration a positive color transparency is used during the process. A potential is applied across the imaging and injecting electrodes upon the closing of switch 7. The imaging electrodes 5 having a cylindrical configuration is rolled across the top surface of the injecting electrode 1 supporting the suspension 4. Switch 7 is closed during the period of image exposure. The light exposure causes the exposed particles originally attracted to the injecting electrode 1 to migrate through the liquid carrier and adhere to the surface of the blocking electrode material 12 leaving behind an image on the injecting electrode surface which is a duplicate of the original transparency 9. Upon completion of this exposure step the complementary unwanted pigment particles are detected on the surface of the roller. These particles may be removed from the surface of the roller by any suitable technique such as by slowly rotating brush 14 against the surface of the roller 5. The imaging roller may then be passed back across the surface of the injecting electrode while again exposing the imaging suspension in the same manner as discussed above. However, with this pass of the imaging roller the potential applied across the configuration is decreased so as to selectively remove additional unwanted pigment particles only from the areas of high light intensity. When the cycle is complete the imaging roller 5 may again be cleaned such as by brush 13 and the cycle repeated. As stated above the clean-up brushes are merely exemplary of the various means which might be used to clean the particles from the blocking surface of the imaging electrode. Any other suitable cleaning means may also be used such as wiping, scraping, air blast, the use of a solvent spray or doctor blades. Any of these particle-removing means may be charged to a high potential thereby utilizing electrostatic attractive forces as an aid in insuring complete particle removal. As many successive exposure and imaging enhancement steps may be performed as desired with the voltage on the subsequent image enhancement passes being maintained at a constant value something less than the voltage of the initial imaging pass. Since the carrier liquid may somewhat evaporate during the more extended processes a spray nozzle 15 may be provided to add additional carrier liquid between exposure steps while the roller is being cleaned. The additional carrier liquid will maintain the suspension in optimum condition for particle migration during the ensuing steps.

Referring now to FIG. 2, there is seen a second embodiment of an apparatus which may be used for carrying out the process of the present invention. In this embodiment, the imaging roller 5 of FIG. 1 has been replaced by a tractor assembly 17. The tractor assembly 17 comprises a frame 18 electrically connected to the potential source 6 as well as to rollers 19 and 20. The frame also includes a takeup roll 21 which serves to store the replaceable imaging web 16 which is presented to the surface of the imaging suspension by supply roll 22. The web 16 is adapted to act as a blocking electrode when moved across the surface of the injecting electrode 1. As the tractor moves across the injection electrode the web material 16 is unrolled from the supply roll 22 and rolled up on the takeup roll 21 at a rate such that the web contacts the injecting electrode without imparting relative lateral movement. The dash line 23 schematically represents the path taken by the axial 24 of roller 19, indicating that the web material 16 contacts the imaging suspension 4 and injecting electrode 1 only during movement of the tractor in one direction, that is during the left to right pass as represented in the drawing. Exposure of the pigment suspension 4 takes place during movement of the blocking or imaging electrode from left to right as explained above. As the tractor passes across the surface of the injecting electrode the unwanted pigment particles adhere to the web material 16. When the second left-to-right pass commences, fresh web material 16 will contact the pigment suspension and again remove a portion of the unwanted particles which by their nature were not removed with the initial pass. The voltage on the tractor assembly will be reduced as mentioned above and discussed further below so as to insure removal of only the undesired pigment particles and to prevent removal of pigment particles from the desired image areas, such as the areas of maximum density. The web material winds up on the takeup roll and may later be cleaned or disposed of. The nozzle 15 shown schematically may be used to add additional carrier liquid to the pigment suspension should it dry out excessively during the several pigment removal or image enhancement passes. Since additional unwanted pigment is removed each time the tractor assembly is passed across the surface of the imaging suspension, the image quality will be higher utilizing the multiple pass technique.

Other configurations may be used similar to those disclosed in FIGS. 1 and 2, and the roller and tractor configurations herein represented should be understood as merely being illustrative of the present invention. For example, the roller type blocking electrode such as is demonstrated by FIG. 1 could use a replaceable web material similar to that utilized in the FIG. 2 apparatus. Further, the tractor type mechanism of FIG. 2 could use a continuous belt or web like material which itself could be cleaned in a manner discussed with respect to the procedure of FIG. 1. Thus, a number of ways are available to execute the imaging steps herein discussed such as cleaning the unwanted particles from the electrode surface, replacing the imaging electrodes after each pass or just replacing the surface of the imaging electrode to remove the unwanted particles.

When used in the course of the present invention the term injecting electrode should be understood to mean that it is an electrode which will preferably be capable of exchanging charge with the photosensitive particles of the imaging suspension when the suspension is exposed to light so as to allow for a net change in the charge polarity of the particles. By the term blocking electrode is meant one which is capable of injecting electrons into and receiving electrons from the above mentioned photosensitive particles at a negligible rate when the particles come into contact with the surface of the elecrode. Obviously, if all the polarities in this system are reversed the function of the electrodes will also be reversed.

It is preferred that the injecting electrode be composed of an optically transparent material such as glass overcoated with a conductive material such as tin oxide, copper, copper iodide, gold or the like material, in order to obtain optimum results; however, other suitable materials including many semiconductor materials such as raw cellophane, which are ordinarily not thought of as conductors but which are still capable of accepting injecting charge carriers of the proper polarity under the influence of the applied field, may be used within the course of the present invention. The use of more conductive materials, however, allows for a cleaner charge separation and prevents possible charge build up on the electrode which would tend to diminish the interior electrode field. The blocking electrode on the other hand is selected so as to prevent or greatly retard the injection of electrons into the photosensitive pigment particles when the particles reach the surface of this electrode. The blocking electrode base generally will consist of a material which is fairly high in electrical conductivity. Typical conductive materials are conductive rubber and metal foils, such as steel, aluminum, copper, and brass. Preferably the core of the blocking electrode will have a high electrical conductivity in order to establish the desired polarity differential. However, if a low conductivity material is used a separate electrical connection may be made to the back of the blocking layer of the electrode. Although a blocking layer need not necessarily be used in this system the use of such a layer is preferred because of the markedly improved results which it is capable of producing. It is preferred that the blocking layer when used be an insulator or a semiconductor which will not allow for the passage of sufficient charge carriers under the influence of an applied field to discharge the particles bond to its surface thereby preventing particle oscillation within the system. Although the blocking electrode does allow for passage of some charge carriers it still would be considered to come within the class of preferred materials if it does not allow for the passage of sufficient charge carrier to recharge the particles to the opposite polarity. Exemplary of the preferred blocking layer material used are baryta paper, which consists of paper coated with barium sulfate suspended in a gelatin solution, Tedlar, a polyvinyl fluoride and polyurethane. Any other suitable material having a resistivity of from about $10^7$ ohm-cm. or greater may be employed as the blocking electrode material. Typical materials in this resistivity range include cellulose acetate coated papers, polystyrene, polytetrafluoroethylene, and polyethyleneteraphthalate. The baryta paper, Tedlar and the other materials used as the blocking layer may be wetted on the back surface with tap water or coated with an electrically conductive material. The blocking electrode layer, when utilized, may be a separate replaceable layer which is either taped to the blocking electrode core, or held by a suitable device such as mechanical fasteners which are capable of simply holding the layer on the electrode. In the alternative, the layer may be an integral part of the electrode itself, being either adhesively bonded, laminated, spray coated or otherwise applied to the surface of the electrode core.

Any suitable insulating carrier liquid may be used in the course of the present invention. Typical materials include decane, dodecane, and tetradecane, molten paraffin wax, molten beeswax, and other molten thermoplastic materials, mineral oil, Sohio Odorless Solvent, a kerosene fraction commercially available from Standard Oil Company of Ohio and Isopar G, a long chain saturated aliphatic hydrocarbon commercially available from the Humble Oil Company of New Jersey and mixtures thereof.

A wide range of voltages may be applied between the electrodes in the system. For good image resolution, high image density and low background it is preferred that the potential applied be such as to create an electric field of at least about 300 volts across the imaging suspension. The applied potential necessary to attain this field of strength will of course vary depending upon the interelectrode gap and upon the thickness and type of blocking material used on the blocking electrode surface. Voltages as high as 5,000 volts have been employed to produce images of high quality. The upper limit of field strength is limited only by the breakdown potential of the suspension and blocking material. The voltage applied to the second imaging electrode will be reduced or increased in amount from that of the voltage applied to the first imaging electrode depending upon the results desired. Generally speaking, all that is considered necessary is that the voltage be something greater or less than the initial voltage applied so as to either increase or decrease image contrast depending upon the nature of the imaging suspension utilized in the imaging process and the informational input. For example, it has been found that the resulting contrast of the images produced in the above described process is considerably increased when the first imaging roller is charged to about 4,000 volts and the second imaging roller is charged to about 750 volts. Accordingly, it has further been demonstrated that when the first imaging roller is charged to about 2,000 volts and the second imaging electrode to 4,000 volts the contrast of the image produced is reduced. By presetting the voltages on both imaging electrodes or rollers almost any desired image of a particular contrast may be obtained.

In the polychromatic system, the particles are selected so that those of different colors respond to different wavelengths of light in the visible spectrum corresponding to their principal absorption characteristics and further so that their spectral response curves do not have substantial overlap, thus allowing for color separation and subtractive multicolor image formation. Several different particles are employed namely a cyan colored particle sensitive mainly to red light, a magenta colored particle sensitive mainly to green light, and a yellow colored particle sensitive mainly to blue light. While this is the simplest combination, additional particles having different absorption maxima may be added to improve color synthesis. When mixed together in the carrier liquid, these particles produce a substantially black liquid and when one or more of the particles are caused to migrate from the injecting electrode surface toward the blocking electrode they leave behind particles which produce a color equivalent to the color of the impinging light source. Thus, for example, red light exposure causes the cyan colored pigment to migrate leaving behind the magenta and yellow pigments which combine to produce red in the final image. In the same manner blue and green colors are reproduced by removal of the yellow and magenta pigment respectively and, of course, when white light impinges upon the mix all pigment particles migrate leaving behind the color of the white or transparent substrate. No exposure leaves behind all pigment which combine to produce a black image. It should be recognized that this is an ideal technique of subtractive color imaging in that the particle's color component performs a dual function in that it acts both as the final image colorant and the photosensitive medium of the system. Accordingly, the system represents virtually the ultimate in eliminating the complexity of prior art methods of subtractive color imaging.

It is desirable to use pigment particles which are relatively small in size because smaller particles produce better and more stable pigment dispersions in the liquid carrier and in addition are capable of producing images of greater covering power and higher resolution than would be possible with particles of larger sizes. Even where the pigments are commercially not available in small particle sizes the particle size may be reduced by conventional technique such as ball milling or the like. When the particles are suspended in the liquid carrier they may take on a net electrostatic charge so that they may be attracted towards one of the electrodes in the system depending upon the polarity of the charge with respect to that of the electrode. It is not necessary that the particles take on only one polarity of charge but instead the particles may be attracted to both electrodes. Some of the particles in the suspension initially move towards the injecting electrode while others move towards the blocking electrode with this type of system; however, this particle migration takes place uniformly over the entire area covered by the two electrodes and the effect of imagewise, exposure-induced migration is superimposed thereon. Thus, the apparent bipolarity of these suspensions in no way affects the imaging capability of the system except for the fact that it subtracts some of the particles uniformly from the system before imagewise modulation of the particle migration takes place. In other words, the above behavior causes a portion of the suspended particles to be removed from the system as potential image formers. The effect of subtraction of some of these particles as potential image formers in the system is easily overcome by merely forming an initial suspension of particles contained at a sufficiently high particle concentration such that the system is still capable of producing intense images. Also, it has been found that with some suspensions of this type, either polarity of potential may be applied to the electrodes during imaging.

Any suitable colored photosensitive pigment particle having the desired spectral response such as disclosed in U.S. Patent No. 3,384,488 may be used to form the pigment mix of the imaging suspension for color imaging. The photosensitive pigment may, for example, be polymeric in nature. The percentage of pigment in the insulating liquid carrier is not considered critical; however, for reference purposes it is noted that from about 2 to about 15 percent pigment by weight of the suspension has been found to produce desirable results. While the imaging steps of the present invention are especially suitable for polychromatic imaging they are also likewise suitable for use, as stated above, in conjunction with monochrome imaging. In the latter instance a single color photoresponsive particle of the nature discussed above may be used in the imaging suspension or a number of differently colored photoresponsive particles may be used all of which respond to the same wavelength of light exposure.

As previously stated once the particle image is formed it may be fixed to the respective electrode by any desirable means such as by spraying a binder onto the surface, by laminating an overlay over the image surface or by including a binder in the liquid suspension medium itself. Generally, it will be found preferable to transfer the image from the electrode and fix it on a secondary surface so that the electrode may be reused. Such a transfer step may be carried out by an adhesive pickoff technique, such as with adhesive tape or preferably by electrostatic field transfer. Electrostatic transfer may, for example, be executed by carrying out the imaging procedure described in connection with the above illustrations and then passing a transfer roller over the particle image formed on the transparent injecting electrode, the transfer roller being held at a potential opposite in polarity to that of the imaging electrodes which were initially passed across the surface of the injecting electrode.

Although various electrode spacings may be employed, spacings of less than about 1 mil and extending down to where the electrodes are substantially in virtual contact resulting from being pressed together are preferred. The latter condition constitutes a particularly preferred form of the invention in that there is produced the best resolution and image density. This noted improvement is believed to take place as a result of the high field strength across the suspension during imaging.

DESCRIPTION OF PREFERRED EMBODIMENTS

To further define the specifics of the present invention the following examples are intended to illustrate and not limit the subject matter of the present invention. Parts and percentages are by weight unless otherwise indicated. These examples illustrate the improvements obtained and control capabilities in image contrast and color density by means of the multiple pass technique utilizing an alteration in voltage on the second and ensuing image roller applications. In each of the following examples, except where indicated, a trimix comprising a suspension of yellow, magenta and cyan pigments in Sohio Odorless Solvent 3440, a petroleum fraction available from Standard Oil of Ohio, is exposed to light of a selected color. Integral and analytical measurements of the density of the pigment image remaining on the Nesa glass surface are calculated after each complete cycle. An exposure cycle consists of at least two passes of the imaging roller electrode over the suspension with removal of the adhering particles from the roller electrode before each subsequent pass.

Integral densities are measured on the basis of NESA plate transmission densities with a MacBeth Quantalog densitometer Model TD 100. The integral densities are densities which correspond to total absorption of any and all pigments at the wavelength band corresponding to the color input used. Analytical densities are calculated from the integral density by means of a Monroe Analytical density computer. Analytical densities as calculated are due entirely to each individual colorant in the sample. This is based on the method of determining analytical densities from known integral densities as described in "Principles of Color Photography," Evans, Hansen and Brewer, 1953, pp. 441–447. The effect upon the contrast of the resulting image is expressed in the examples in terms of the gamma corresponding to the particular density readings. Gamma is an expression relating the change in density of a particular image per change in the amount of exposure. An increase in gamma indicates an increase in image contrast and, likewise, a decrease in gamma indicates a decrease in image contrast. The examples are carried out utilizing an apparatus of the general type illustrated in FIG. 1. The roller electrode has a 2 mil film of "Tedlar" on its surface and is approximately 2½ inches in diameter. The roller moves across the plate surface at about 2 inches per second. The plate employed is roughly 3 inches square and is exposed with a light intensity of about 200 ft. candles. Exposure is made with a 3200° K. lamp through a Kodachrome transparency which is placed between the white light source and the NESA glass substrate.

EXAMPLE I

An imaging suspension comprising equal amounts of Bonadur Red B, 1-(4'-chloro-5'-ethyl-2' sulfonic acid) azobenzene - 2 - hydroxy - 3 - naphthoic acid, available from American Cyanamid, Monolite Fast Blue G.S., the alpha form of metal-free phthalocyanine, C.I. No. 74100, available from Arnold Hoffman Company and proprietary yellow pigment, N-2''-pyridyl-8,13-dioxodinaphtho-(2,1-6; 2',3'-d) furan-6-carboxamide, more completely defined in U.S. patent application No. 421,281 filed Dec. 28, 1964 and having a common assignee, now U.S. Pat. 3,447,922, in Sohio Solvent 3440 is prepared, with the total pigment constituting about 8 percent by weight of the suspension. These pigments are magenta, cyan and yellow, respectively. The resulting mixture is coated on a NESA glass substrate and exposed as discussed above such that a colored image is projected onto the trimix as the roller electrode moves across the surface of the NESA glass. The roller electrode is held at a negative potential of about 3,000 volts with respect to the NESA glass substrate. After making the initial pass the surface of the roller electrode is cleaned and again passed across the imaging suspension on the NESA glass substrate with the voltage on the second pass being reduced to about 1500 volts. The image produced on the NESA surface is contact transferred to a receiving paper copy sheet. The gamma reading calculated as discussed above is 2.4. The entire imaging process is then repeated with the voltage on the first pass roller being 3,000 volts and that on the second pass roller being 4,000 volts. The gamma reading obtained after this procedure is 1.4. The gamma reading of 2.4 indicates an increase in contrast of the resulting image on the NESA electrode when compared to the gamma reading of 1.4 obtained when the voltage on the second imaging roller is increased thus demonstrating the capability of controlling the contrast effect obtained.

EXAMPLE II

An imaging suspension comprising equal amounts of Bonadur Red B, the proprietary yellow pigment disclosed in Example I, and β-phthalocyanine is prepared in a manner similar to that of Example I. The resulting mixture is coated on a NESA glass substrate and exposed such that a colored image is projected onto the trimix as the roller electrode moves across the surface. In this instance the roller electrode is held at a negative potential of about 1500 volts with respect to the NESA glass substrate. After making the initial pass the surface of the roller electrode is cleaned and again passed across the NESA glass substrate surface with the voltage of the roller during the second pass being increased to 4,500 volts. The resulting image on the NESA surface is then transferred to the surface of a receiving paper sheet, the necessary density readings taken, as discussed above, and the resulting corresponding gamma reading of 0.4 obtained. The entire process is then repeated with the exception that the voltages are reversed and the voltage on the roller during the initial pass is 4,500 volts and that on the second pass reduced to 1,500 volts. The resulting gamma is measured at 1.0 again demonstrating the capability of controlling the contrast of the resulting image.

EXAMPLE III

The process of Example II is repeated with the exception that the voltages utilized are changed such that with the initial pass of the imaging roller the voltage is maintained at a negative 4,000 volts and the voltage applied to the imaging roller on the second pass is 2,500 volts. The resulting gamma reading is 0.4. The process steps are then repeated with the voltage on the first pass being maintained at a negative 4,000 volts and the voltage on the roller of the second pass reduced to 750 volts. The resulting gamma reading is 1.5. This example illustrates the capability of controlling the resulting image contrast by varying the degree, in the particular direction, in which the voltages are changed.

EXAMPLE IV

An imaging suspension comprising Watchung Red B, C.I. No. 15865, 1-(4'-methyl-5'-chloro-2'-sulfonic acid) azobenzene-2-hydroxy-3-naphthoic acid, Monolite Fast Blue and the proprietary yellow pigment of Example I is prepared in klearol, a pharmaceutical grade of mineral oil, with the pigment comprising about 10 percent by weight of the suspension. The pigments are magenta, cyan and yellow respectively.

With a first voltage of 3,000 volts and a second voltage of 1,000 volts, a gamma of 0.9 is obtained. With a first voltage of 3,000 volts and a second voltage of 4,000 volts, the gamma is 0.5.

EXAMPLE V

An imaging suspension comprising Bonadur Red B, is prepared, 7 parts by weight of the photosensitive particles being dispersed in the Sohio Odorless Solvent 3440. The suspension is coated on the surface of a NESA glass electrode. With the voltage held at a negative 4,000 volts, a Tedlar blocking electrode is passed across the suspension while simultaneously exposing a black and white negative transparency to the suspension using a visible light source. After cleaning, the Tedlar electrode is again rolled across the injecting electrode surface with the voltage held at a negative 2,500 volts. A gamma of 0.40 is obtained. The process steps are then repeated with the first roller voltage being 4,000 volts and the second roller voltage being 750 volts. A gamma of 1.5 is obtained. Thus, by lowering the second imaging voltage gamma is increased, the extent of increase being controlled by the degree of reduction in voltage as is evident from the results.

Although the present examples were specific in terms of conditions and materials used any of the above mentioned materials may be substituted when applicable with similar results being obtained. In addition to the steps used in the process of the present invention other steps or modifications may be used if desirable. For example, although generally the voltage applied to the second and subsequent passes of the imaging roller remain constant this need not necessarily be the case and the voltage on a third or any ensuing pass may be changed from that of the preceding imaging step. In addition other materials may be incorporated in the imaging suspension and the other facets of the invention which will enhance, synergize or otherwise desirably effect the properties therein desired. For example, various sensitizers may be utilized in conjunction with the imaging suspension.

Anyone skilled in the art will have other modifications occur to them based on the teachings of the present invention. These modifications are intended to be encompassed within the scope of this invention.

What is claimed is:

1. The process of photoelectrophoretic imaging which comprises the steps of: (a) subjecting a layer of a suspension to an applied first potential between at least two electrodes, at least one of which is partially transparent, said suspension comprising a plurality of finely divided particles in a carrier liquid each of said particles comprising an electrically photosensitive pigment; (b) exposing said suspension to an image through said transparent electrode with a source of activating electromagnetic radiation whereby an image is formed on said transparent electrode with a complementary image of unwanted particles being formed on the other of said electrodes; (c) introducing in place of said other electrode an electrode having a surface free from said unwanted particles; and (d) re-exposing said suspension to said image while simultaneously applying a second potential to said suspension, said second potential varying substantially from that of said first potential in order to control the contrast of the final image.

2. The process as disclosed in claim 1 wherein steps (c) and (d) are repeated at least once.

3. The process as disclosed in claim 1 wherein said second potential is greater than said first potential.

4. The process as disclosed in claim 1 wherein said second potential is less than said first potential.

5. The process as disclosed in claim 1 wherein said imaging suspension comprises a plurality of at least two differently colored finely divided particles in a carrier liquid each of said particles comprising an electrically photosensitive pigment whose principle light absorption band substantially coincides with its principle photosensitive response.

6. The process as disclosed in claim 1 wherein said second potential is greater than said first potential.

7. The process as disclosed in claim 1 wherein said second potential is less than that of said first potential.

8. An electrophoretic imaging process comprising subjecting a layer of a suspension to an applied first potential between at least two electrodes, at least one of which is partially transparent, said suspension comprising a plurality of finely divided particles in a substantially insulating carrier liquid each of said particles comprising an electrically photosensitive pigment which is both the primary electrically photosensitive ingredient and the primary colorant for said particles, said suspension including cyan colored particles which are principally photosensitive to red light, magenta colored particles which are principally photosensitive to green light and yellow colored particles which are principally photosensitive to blue light, exposing said suspension to a light image through said transparent electrode thereby producing a pigment image on said transparent electrode corresponding to said light image and a complementary image on said other electrode of unwanted pigment particles, separating said other electrode and cleaning said electrode by removing the adhering unwanted particles from the surface of said other electrode, returning said other electrode into contact with said imaging suspension and reimaging by re-exposing said suspension to said image through said transparent electrode while generally simultaneously applying a second potential to said suspension, said second potential varying substantially in amount from said first potential in order to control the contrast of the final image.

9. The process as disclosed in claim 8 wherein said cleaning and reimaging steps are repeated at least one time.

10. The process as disclosed in claim 8 wherein said second potential is greater than said first potential.

11. The process as disclosed in claim 8 wherein said second potential is less than said first potential.

References Cited

UNITED STATES PATENTS 3,384,565   5/1968   Tulagin et al. _____ 204—181

GEORGE F. LESMES, Primary Examiner

J. C. COOPER III, Assistant Examiner

U.S. Cl. X.R.

96—1, 1.2, 1.3, 1.4